(12) United States Patent
Kimura et al.

(10) Patent No.: US 6,216,554 B1
(45) Date of Patent: Apr. 17, 2001

(54) CONTROL CABLE

(75) Inventors: Hiroshi Kimura, Nagoya; Masahiko Aoki, Aichi-ken; Kanji Nagayoshi, Kani; Kenichi Nishida, Seto, all of (JP)

(73) Assignee: Chuohatsujo Kabushiki Kaisha (JP)

( * ) Notice: Subject to any disclaimer, the term of this patent is extended or adjusted under 35 U.S.C. 154(b) by 0 days.

(21) Appl. No.: 09/268,885

(22) Filed: Mar. 16, 1999

(30) Foreign Application Priority Data

Mar. 20, 1998 (JP) .................................................. 10-092781

(51) Int. Cl.[7] .................................................... F16C 1/26
(52) U.S. Cl. .......................................... 74/502.5; 74/500.5
(58) Field of Search ........................... 74/502.5, 501.5 R, 74/500.5, 502.4, 502.6

(56) References Cited

U.S. PATENT DOCUMENTS 4,951,523 * 8/1990 Shiota et al. ...................... 74/502.5
5,241,880 * 9/1993 Mizobata et al. .................. 74/502.5

FOREIGN PATENT DOCUMENTS

| 0121215 | * | 7/1984 | (JP) | 74/502.5 |
| 2093113 | * | 4/1990 | (JP) | 74/502.5 |
| 4-92112 | * | 3/1992 | (JP) | 74/502.5 |
| 2664435 |   | 6/1997 | (JP) . | |

* cited by examiner

Primary Examiner—Mary Ann Green
(74) Attorney, Agent, or Firm—Lackenbach Siegel

(57) ABSTRACT

A control cable with an inner cable having on its outer peripheral surface an inner coating formed of a polyamide synthetic resin while an outer casing having on its inner peripheral surface a liner formed by a mixture of polybutylene terephthalate and a polybutylene decanedicarboxylate copolymer and an elastomer having an epoxy radical containing an olefinic copolymer wherein the elastomer is in a range of 0~30% by weight of the total resinous composition or mixture of PBT and PBD.

12 Claims, 3 Drawing Sheets

CONTROL CABLE

BACKGROUND OF THE INVENTION

1. Field of the Invention

This invention related to a control cable comprising an outer casing and an inner cable slidably inserted into said outer casing and more particularly to such control cable drastically improved in its durability as well as its loading efficiency.

2. Description of the Prior Art

It is well known to coat an outer peripheral surface of the inner cable with a synthetic resin film as an inner coating and to provide the inner peripheral surface of the outer casing with a synthetic resin liner in order to improve durability and the loading efficiency of the control cable. For example, Japanese Patent No. 2664435 discloses a control cable in which a polyamide resin composition is used as the inner coating and a polybutylene terephthalate resin composition is used as the liner. However, in this control cable of the prior art, said liner contains an amount of filler substantially comprising potassium titanate whisker. As is well known to those skilled in the art, use of this potassium titanate whisker is disadvantageous from the viewpoints of its high cost as well as of its relatively low durability.

SUMMARY OF THE INVENTION

In view of the problem as has been described above, it is a principal object of the invention to provide a control cable remarkable improved in its durability as well as its loading efficiency using an inexpensive material.

The object set forth above is achieved, according to the invention, by a control cable comprising an outer casing an inner cable slidably inserted into said outer casing, wherein said inner cable is provided on its outer peripheral surface with inner coating formed by a polyamide synthetic resin while said outer casing is provided on its inner peripheral surface with a liner formed by a mixture of polybutylene terephthalatate and polybutylene decanedicarboxyplate copolymer and an elastomer having an epoxy radical containing an olefinic copolymer as an essential ingredient where the content of said elastomer is 0–30% by weight of the total resin composition.

Preferably, said inner coating presents a modulus of bending elasticity of 8400–13500 kg/cm² in its water-soaked state (50% saturated at 23° C.).

More preferably, said liner presents a modulus of bending elasticity of 3300–8000 kg/cm² which is lower than the modulus of bending elasticity of said inner coating as measured according to ASTM D790.

The copolymer PBT/D used as the resinous composition to form the liner according to the invention is the copolymer (PBT/D) and it comprises polybutylene terephthalate (PBT) obtained by condensation polymerizing terephthalic acid with 1, 4-butanediol, on one hand, and polybutylene decanedicarboxylate (PBD) obtained by condensation polymerizing decanedicarboxylic acid with 1, 4-butanediol, on the other hand. The modulus of bending elasticity of the composition according to the invention is in a range of 3300–8000 kg/cm² and a mol ratio between PBT and PBD is not critical. Accordingly, a mixture of two or more PBT/Ds having different mol ratios as well as a mixture of PBT and PST/D may be used in the practice of the invention. A substantial mol ratio of PBT/D is usually selected in a range of 95/5~80/20.

The epoxy radical containing an olefinic copolymer used as the resinous composition forming the liner according to the invention is the olefinic copolymer which contains the epoxy radical in its side chain or main chain but no so-called expoxy resin. Examples of such epoxy radical containing an olefinic copolymer include olefinic copolymer having glycidyl radical such as glycidyl ester, glycidyl ether or glycidyl amine in its side chain and a double bond containing an olefinic copolymer in which said double bond is epoxidated. Of these epoxy radical containing olefinic copolymers, a copolymer comprising α—olefin and glycidyl ester of α, β—unsaturated acid is preferably used in the invention. Examples of β—olefins include ethylene, propylene and butene-1. Glycidyl ester of α, β—unsaturated acid is a compound represented by a formula 1 as indicated below and specific examples thereof include glycidyl acrylate, glycidyl methacrylate and glycidyl ethacrylate:

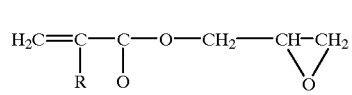

[Formula 1]

(R represents hydrogen atom or lower alkyl)

Content of an epoxy radical in said epoxy radical containing olefinic copolymer is usually in a range of 0.1~30% weight, preferably in a range of 0.2–20% by weight. The content lower than 0.1% by weight could not achieve a desired effect through a desired reaction with PBT/D and the content higher than 30% by weight would cause a gelation during melt kneading with PBT/D, inevitably deteriorating the extrusion stability, moldability and mechanical properties of such material.

It is also possible to copolymerize the other olefinic monomer such as methyl acrylate, methyl methacrylate, acrylonitril, styrene, vinyl acetate or vinyl ether so far as the desired effect of the invention is not adversely affected thereby.

Examples of the elastomer used with the epoxy radical containing an olefinic copolymer as the resinous comosition forming the liner according to the invention may be a polyolefin elastomer, diene elastomer, acryl elastomer, polyamide elastomer, polyester elastomer, silicone elastomer, fluoroelastomer and polysulfide elastomer. One or more of these elastomers may be used in the practice of the invention.

The content of the copolymer PBT/D ingredient in the resinous composition forming the liner according to the invention is in a range of 70–100% by weight and a modulus of bending elasticity of the composition according to the invention is selected in a range of 3300~8000 kg/cm². The content lower than 70% by weight would disadvantageously result in a poor heat resistance of the control cable. The content of the epoxy radical containing an olefinic copolymer ingredient in the resinous composition forming the liner according to the invention is in a range of 0~30% by weight and a modulus of bending elasticity of the composition according to the invention is selected in a range of 3300–8000 kg/cm², more preferably in a range of 5~20% by weight. A modulus of bending elasticity higher than 800 kg/cm² would result in the deterioration of the loading efficiency and a modulus of bending elasticity lower than 3300 kg/cm² would decrease the durability.

While a melt viscosity of the resinous composition sued to form the liner according to the invention is not critical so long as it allows extrusion of the liner to be effectively achieved, the melt viscosity is selected so that a melt flow rate of 1~30 g/10 min, preferably a melt flow rate of 1~20 g/10 min and more preferably a melt flow rate of 1~10 g/min may be obtained at a temperature of 250° C. under a load of 1 kg.

Preparation of the resinous composition used to form the liner according to the invention is not limited to a specific process. For example, powder, pellet or flake of PBT/D and elastomer may be dry blended using suitable means such as a ribbon blender, Henschel mixer or V-blender and then melt kneaded using suitable means such as a Banbury mixer, a mixing roll, a single-screw or twin-screw extruder or a kneader. Alternatively, it is also possible to feed said materials successively to a melt kneading apparatus without the previous step of dry blending. As the most typical process of these various processes, said materials may be melt kneaded using the single-screw or a twin-screw extruder having a sufficient kneading force.

Though not essential ingredients for the resinous composition used to form the liner according to the invention, lubricant such as polytetrafluoroethylene, silicone oil, molybdenum dioxide, graphite or boron nitride may be added in a range of less than 10% by weight in order to improve slidability.

If it is desired, fibrous and/or granular reinforcement may be added to the resinous composition used to form the liner according to the invention so far as such reinforcement does not adversely affect the invention.

Examples of such reinforcement include inorganic fiber such as glass fiber, alumina fiber, silicon carbonate fiber, ceramic fiber, asbestos fiber, plaster fiber and metallic fiber and carbon fiber. Examples of said granual reinforcement include silicates such as wollastonite, sericite, kaolin, mica, clay, bentonite, and alumina silicate, in addition to alumina, metallic oxides such as silicon oxide, magnesium oxide, zirconium oxide and titanium oxide, carbonates such as calcium carabonate, magnesium carbonate and dolomite, sulfates such as calcium sulfate and barium sulfate, glass beads, silicon carbide, Si AlO N and silica. These reinforcements may be solid or hollow. It is also possible to use two or more of these reinforcements and, if it is desired, to pretreat these reinforcements with a silane or titanium containing coupling agent prior to use.

DESCRIPTION OF THE PREFERRED EMBODIMENT

A preferred embodiment of the invention will be described more in detail in comparison to controls with respect to the accompanying drawings.

Figure 1:
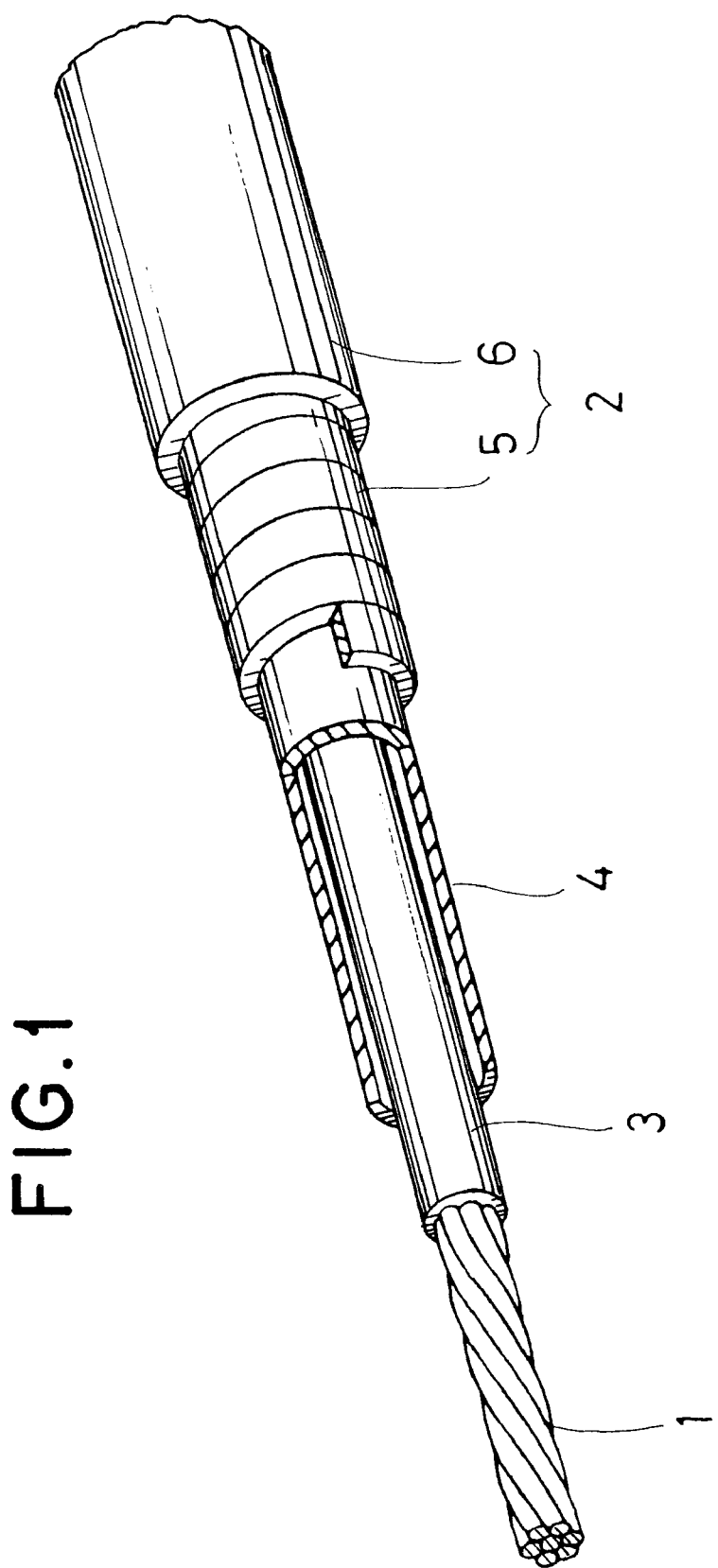
FIG. 1 is a perspective view showing an embodiment of the control cable made according to the invention and partially broken away.

Referring to FIG. 1, reference numeral 1 designates an inner cable, reference numeral 2 designates an outer casing reference numeral 3 designates an inner coating and reference numeral 4 designates a liner.

The inner cable 1 is a cable structure comprising seven strands which comprise, in turn, seven steel wires twisted into a single strand. The inner cable 1 has an outer diameter of 3.0 mm and its outer peripheral surface covered with an inner coating having a thickness of 0.4 mm.

Flat steel wire 5 is spirally wound on the liner 4 and a coating 6 of polypropylene is provided on said spirally wound liner 4 so that the liner 4 may have its inner diameter of 50 mm.

The inner coating 3 and the liner 4 define therebetween a space having a thickness of 0.8 mm as measured in the diametrical direction and this space is filled with silicone grease.

Compositions of the inner coating 3 and composition of the liner 4 in the embodiment of the invention are shown by Tables 1 and 2, respectively, in comparison to those in controls.

TABLE 1

|  |  |  | Modulus of bending Elasticity (kg/cm$^2$) | |
|---|---|---|---|---|
|  |  | Material | Dried | Water soaked |
| Embodiment | Comp-A | 66 nylon | 17200 | 8800 |
|  | Comp-B | 11 nylon | 10000 | 10000 |
| Control | Comp-C | 6 nylon | 28800 | 12300 |

A modulus of bending elasticity of 28800 or higher in a water soaked state would deteriorate the softness quality and be unacceptable for the inner coating material.

TABLE 2

|  |  | PBT/D or PBT | Epoxy radical containing polyolefin | Other elastomer | Content (W %) | Modulus of bending elasticity (kg/cm$^2$) |
|---|---|---|---|---|---|---|
| Emb. | Comp-1 | 87/13 | (1) | — | 80/20/0 | 4500 |
|  | Comp-2 | 87/13 | (1) | — | 70/30/0 | 3500 |
|  | Comp-3 | 95/5 | (1) | — | 70/30/0 | 7600 |
|  | Comp-4 | 80/20 | — | — | 100/0/0 | 3300 |
|  | Comp-5 | 87/13 | (2) | — | 80/20/0 | 4700 |
|  | Comp-6 | 87/13 | (1) | (3) | 90/5/5 | 5400 |
|  | Comp-7 | 87/13 | (1) | (4) | 80/10/10 | 4400 |
|  | Comp-8 | 87/13 | (1) | (5) | 80/10/10 | 4600 |
|  | Comp-9 | 87/13 | (1) | (6) | 80/10/10 | 4400 |
| Contr. | Comp-10 | 100/0 | — | — | 100/0/0 | 23000 |
|  | Comp-11 | 100/0 | (1) | — | 70/30/0 | 12000 |
|  | Comp-12 | 80/20 | (1) | — | 75/25/0 | 2000 |

(1) Ethylene glycidylmethacrylate = 94/6 copolymer
(2) Ethylene glycidylmethacrylate = 97/3 copolymer
(3) Ethylene butene-1 copolymer ("TAFUMA" A4085, Mitsui Chemicals)
(4) Ethylene propylene copolymer ("TAFUMA" P0680, Mitsui Chemicals)
(5) Ionomer (" HAIMIRAN" 1855 Mitsui DuPont)
(6) Ethylene propylene diene copolymer (EPOM-3045, Mitsui Chemicals)

Figure 2:
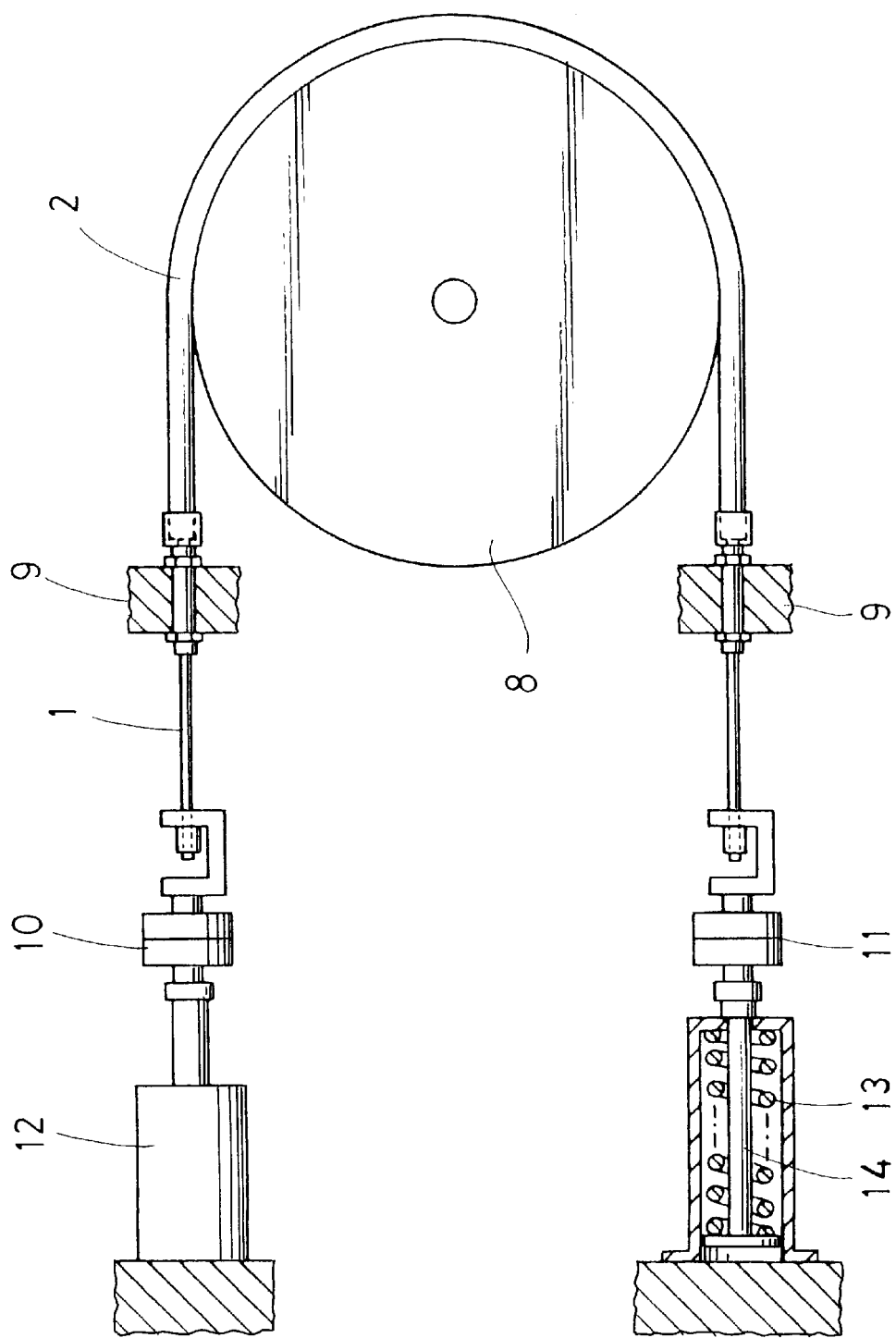
FIG. 2 is a diagram illustrating an apparatus used to measure properties of the control cable.

For the embodiments of the invention and the controls, the loading efficiency and the durability were tested using the apparatus as illustrated by FIG. 2.

Referring to FIG. 2, reference numeral 8 designates a pulley having a diameter of 300 mm. Each control cable made on an experimental basis was draped on this pully 8 over an angle of 180° and its outer casing 2 was fixed to a jig 9. An input end of the inner cable 1 was connected to a piston rod of an air cylinder 12 serving as a drive source via an input load cell 10 while an output end of the inner cable 1 was connected to a rod 14 via an output load cell 11 wherein said rod 14 was biased by a reaction force under an elasticity of a compression coil 13.

Loading efficiency is given by a ratio between the input load F of 120 kgF and output load W multiplied by 100, i.e., W/F×100.

Figure 3:
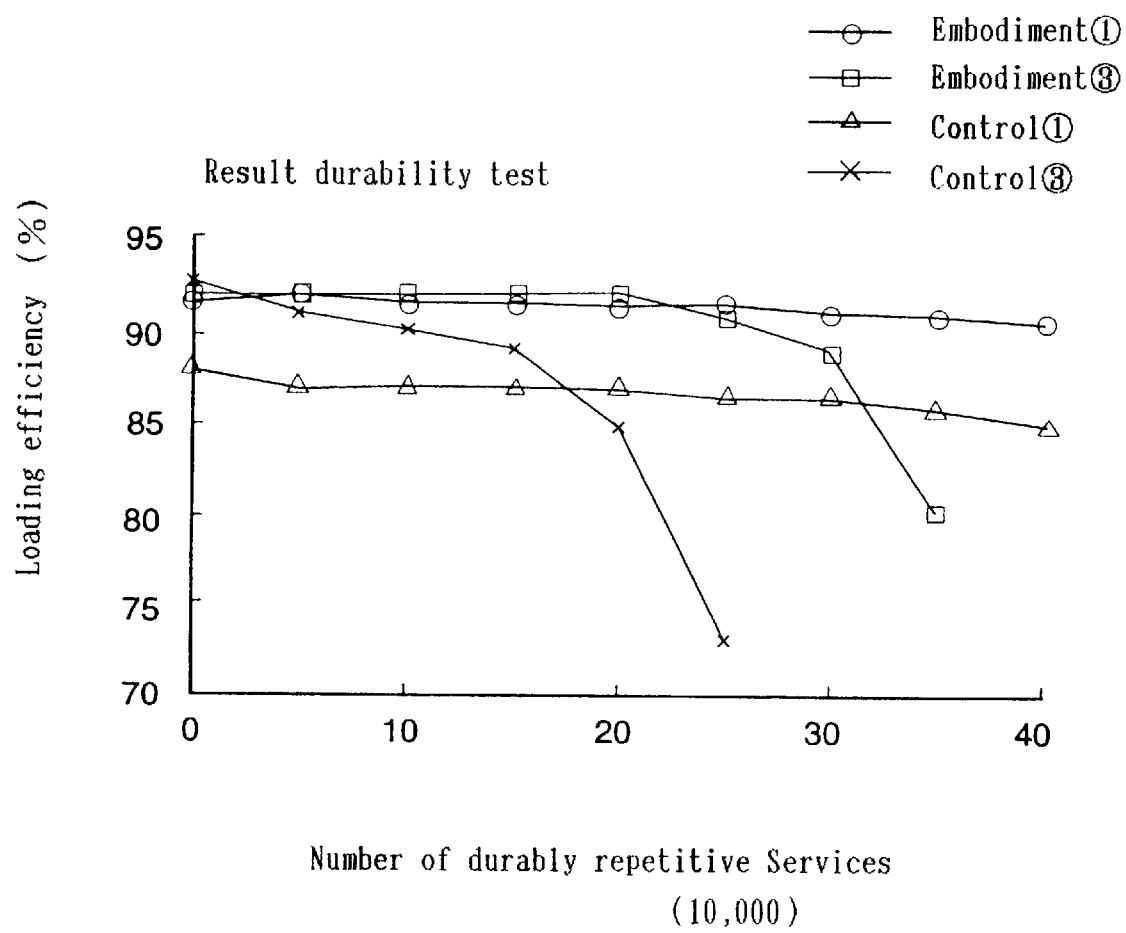
FIG. 3 is a graphic diagram indicating a result of the durability test conducted on the control cable made according to the invention.

Result of the Loading efficiency test is shown in Table 3 and the result of the durability test is shown in FIG. 3.

TABLE 3

Result of loading efficiency measurement

|  | Inner coating | Liner | Load efficiency %) |
|---|---|---|---|
| Emb. 1 | Composition A | Composition 1 | 91.5 |
| Emb. 2 | Composition A | Composition 3 | 90.0 |
| Emb. 3 | Composition A | Composition 4 | 92.0 |
| Emb. 4 | Composition A | Composition 6 | 90.5 |
| Emb. 5 | Composition B | Composition 1 | 91.0 |
| Cont. 1 | Composition C | Composition 10 | 88.0 |
| Cont. 2 | Composition A | Composition 11 | 86.5 |
| Cont. 3 | Composition A | Composition 12 | 92.5 |

As will be apparent from Table 3, a loading efficiency of 90% or higher was obtained for the cases in which the inner coating 1 has composition A or B and the liner 4 has composition 1,3,4,6 or 12. This for the reason that the composition of the liner 4 is PBT/D. A loading efficiency lower than 90% for the case in which the liner 4 has composition 10 or 11. This is for the reason that the composition of the liner 4 is other than PBT/D.

As indicated by FIG. 3, the control 3 in which the inner coating 1 has composition A and the liner 4 has composition 12 is poor in durability due to the modulus of bending elasticity of its liner 4 is as low as 2000 kg/cm².

The tested embodiments of the invention clearly indicate that the control cable made according to the invention has excellent durability as well as good loading efficiency and both characteristics are better than those achieved by the control cables of the prior art.

What is claimed is:

1. Control cable comprising:
an outer casing and an inner cable slidably inserted into said outer casing, wherein said inner cable having on its outer peripheral surface an inner coating formed by a polyamide synthetic resin having a modulus of bending elasticity while said outer casing having on its inner peripheral surface a liner formed of a mixture of polybutylene terephthalate and polybutylene decanedicarboxylate copolymer, and an elastomer having an epoxy radical containing an olefinic copolymer wherein said elastomer is in a range of 0~30% by weight of the composition of said mixture, and wherein said liner has a modulus of bending elasticity in a range of 3300~8000 kg/cm² which is lower than the modulus of bending elasticity of said inner coating, and said inner coating has a modulus of bending elasticity of 8400~13,500 kg/cm² in a water-soaked state.

2. An improved control cable comprising an outer casing and an inner cable slidably inserted into said outer casing, wherein said inner cable having on its outer peripheral surface an inner coating formed by a polyamide synthetic resin having a modulus of bending elasticity while said outer casing having on its inner peripheral surface a liner formed of a mixture of polybutylene terephthalate and polybutylene decanedicarboxylate copolymer, and an elastomer having an epoxy radical containing an olefinic copolymer wherein said elastomer is in a range of 0~30% by weight of the composition of said mixture.

3. Control cable according to claim 2, wherein said inner coating has a modulus of bending elasticity of 8400~13500 kg/cm² in a water-soaked state.

4. Control cable according to claim 2, wherein said liner has a modulus of bending elasticity in a range of 3300~8000 kg/cm², which is lower than a modulus of bending elasticity of said inner coating.

5. Control cable according to claim 2, wherein said inner coating is softer than said liner.

6. Control cable according to claim 2, further including in the composition of said liner, a lubricant selected from the group consisting of polytetrafluoroethylene, silicone oil, molybdenum dioxide, graphite, and boron nitride.

7. Control cable according to claim 6, wherein said lubricant is less than 10% by weight of said liner.

8. Control cable according to claim 2, further including in the composition of said liner, a fibrous and/or granular reinforcement material.

9. Control cable according to claim 8, wherein said fibrous reinforcement material is selected from the group consisting of inorganic fiber, glass fiber, alumina fiber, silicon carbonate fiber, ceramic fiber, asbestos fiber, plastic fiber, metallic fiber, carbon fiber, and mixtures thereof.

10. Control cable according to claim 8, wherein said granular reinforcement material is selected from the group consisting of silicates, wollastonite, sericite, kaolin, mica, clay, bentonite, alumina silicate, alumina metallic oxides, such as silicon oxide, magnesium oxide, zirconium oxide, titanium oxide, carbonates, such as calcium carbonate, magnesium carbonate, dolomite, sulfates, such as calcium sulfate and barium sulfate, glass beads, silicone carbide, Si-Al-O-N compound, silica, and mixtures thereof.

11. Control cable according to claim 8, wherein said reinforcement materials may be solid or hollow.

12. Control cable according to claim 8, wherein said reinforcement material is pre-treated prior to use with a silane or titanium containing coupling agent.

* * * * *